Patented May 21, 1929.

1,713,654

UNITED STATES PATENT OFFICE.

JESSE A. GUYER, OF LA SALLE, NEW YORK, ASSIGNOR TO THE MATHIESON ALKALI WORKS, INC., OF NEW YORK, N. Y., A CORPORATION OF VIRGINIA.

MANUFACTURE OF CALCIUM HYPOCHLORITE.

No Drawing. Application filed August 4, 1926. Serial No. 127,172.

This invention relates to improvements in the production of calcium hypochlorite products. In the manufacture of calcium hypochlorite products, it is usually desirable to make products that are free from calcium chloride or contain but a minimum of calcium chloride for several reasons. In particular, calcium chloride is very hygroscopic and makes the products difficult to dry when present in substantial amount, and this same property of calcium chloride also tends to make the product unstable when it contains calcium chloride in substantial amount. The present invention provides a method of freeing calcium hypochlorite products from such calcium chloride as they may contain.

According to the present invention, the calcium hypochlorite product containing calcium chloride is treated with a caustic alkali such as caustic soda in amount chemically equivalent to the calcium chloride content of the product. Calcium chloride present may thus be converted to calcium hydroxide with the formation of alkali chloride. The alkali chlorides such as sodium chloride and lime, or calcium hydroxide, apparently do not adversely affect the stability of calcium hypochlorite, and likewise these substances are not hygroscopic, at least not to such an extent as to involve difficulties in drying the product. Moreover, once the product is dried these substances do not tend to absorb water.

The process of the invention is applicable to dry products, or to slurries and filter cakes, or the like. In carrying out the invention, an amount of caustic alkali approximately equivalent to the calcium chloride present is thoroughly mixed with the calcium hypochlorite product in the presence of sufficient water to enable the mixture to be thoroughly mixed. In treating a dry product, all of the water necessary must be added, and in treating a wet product such as a slurry or an undried filter or press cake allowance is made for the water already present. It is particularly advantageous to carry out the operation of the present invention at a stage in the production of the calcium hypochlorite product such that no water or but a minimum of water need be added. The caustic alkali may be supplied as such and dissolved during mixture with the calcium hypochlorite product or it may be supplied as a solution. The caustic alkali may, for example, be supplied dissolved in the water, or part of the water, added to permit adequate mixture. Following treatment with caustic alkali, the resulting slurry or paste may be dried either with or without pressing. To illustrate: 200 pounds of a calcium hypochlorite-calcium chloride filter cake containing about 20 pounds of calcium chloride is treated with 14.4 pounds of sodium hydroxide and sufficient water to facilitate mixing, for example, 11 pounds of water. After addition of the sodium hydroxide and water, the mixture is thoroughly mixed and subsequently dried.

I claim:

1. An improved method of eliminating calcium chloride from calcium hypochlorite products containing the same which comprises treating the calcium hypochlorite product containing calcium chloride with caustic alkali in the presence of water.

2. An improved method of eliminating calcium chloride from calcium hypochlorite products containing the same which comprises treating the calcium hypochlorite product containing calcium chloride with sodium hydroxide in the presence of water.

3. An improved method of eliminating calcium chloride from calcium hypochlorite products containing the same which comprises treating the calcium hypochlorite product containing calcium chloride with an amount of caustic alkali approximately equivalent to the amount of calcium chloride present in the presence of water.

In testimony whereof I affix my signature.

JESSE A. GUYER.